Figure 1:
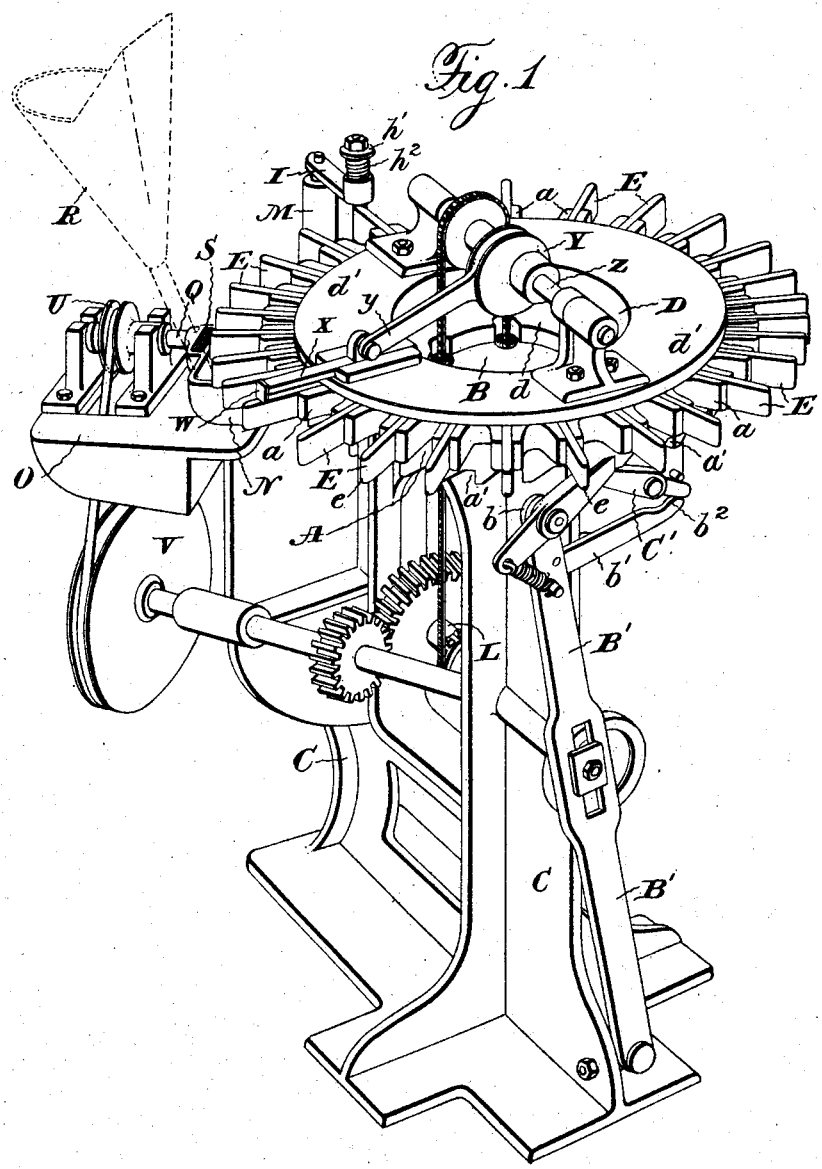

T. A. PALMER & C. A. CARLSON.
BOX SANDING MACHINE.
APPLICATION FILED OCT. 19, 1899.

901,367.

Patented Oct. 20, 1908.

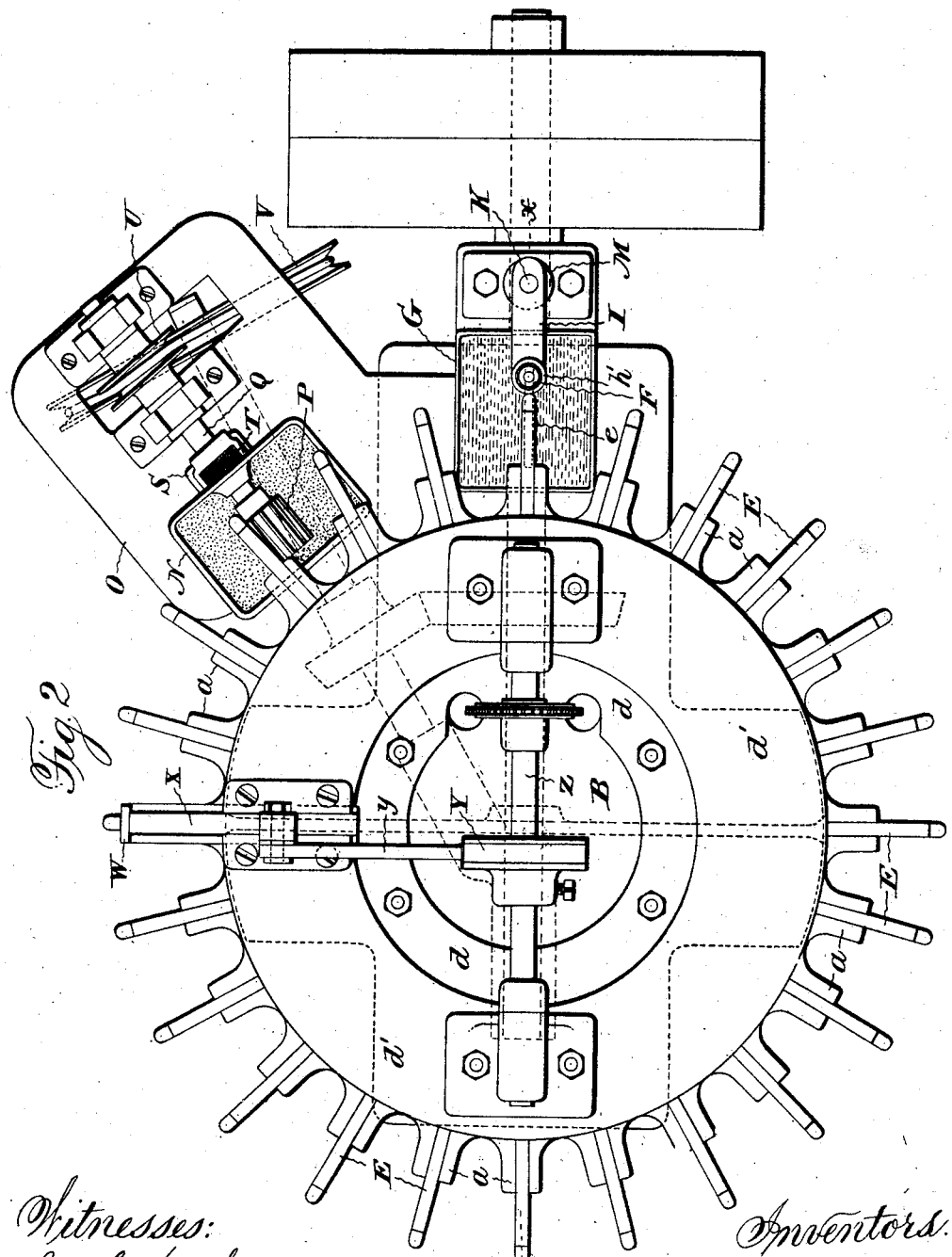

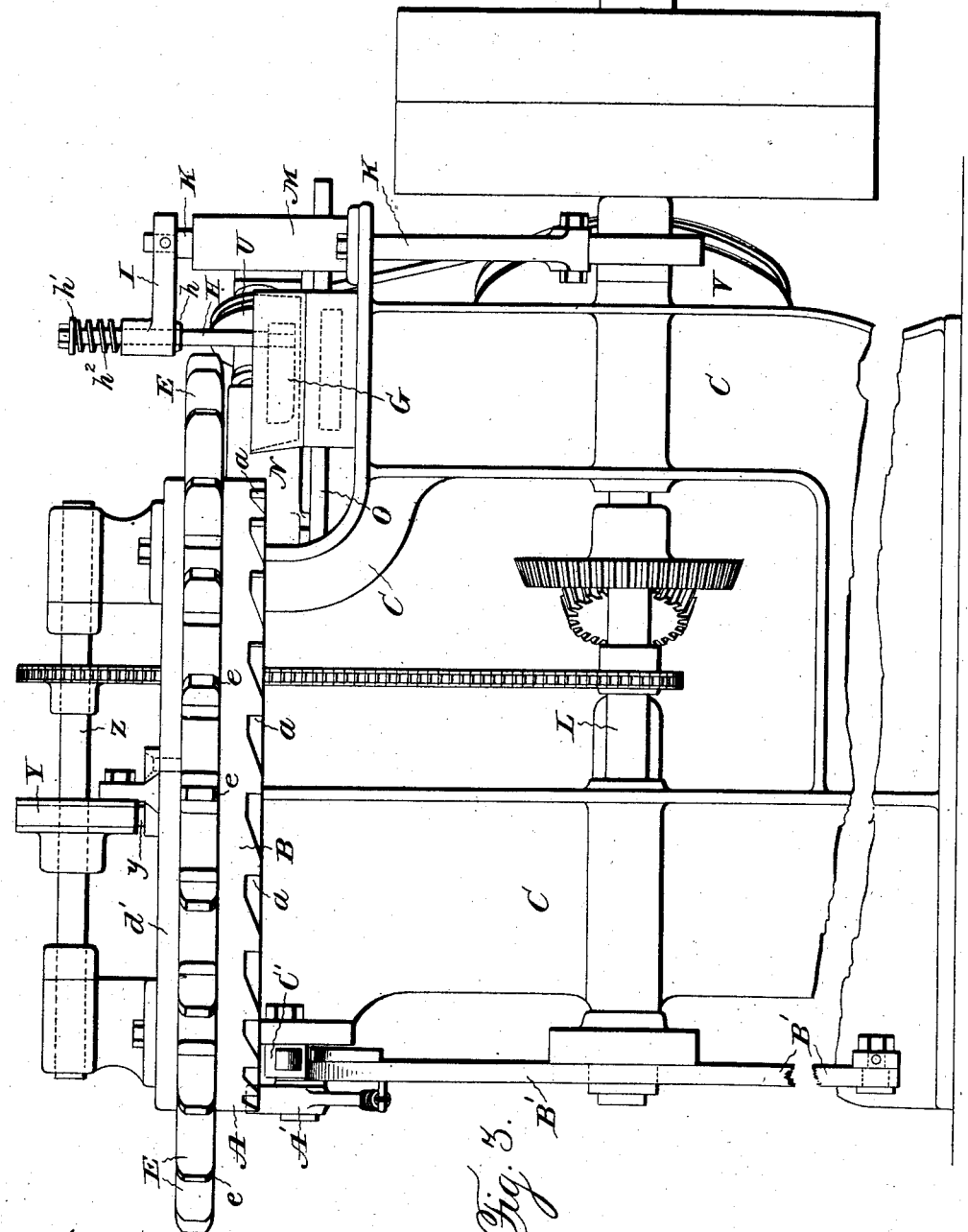

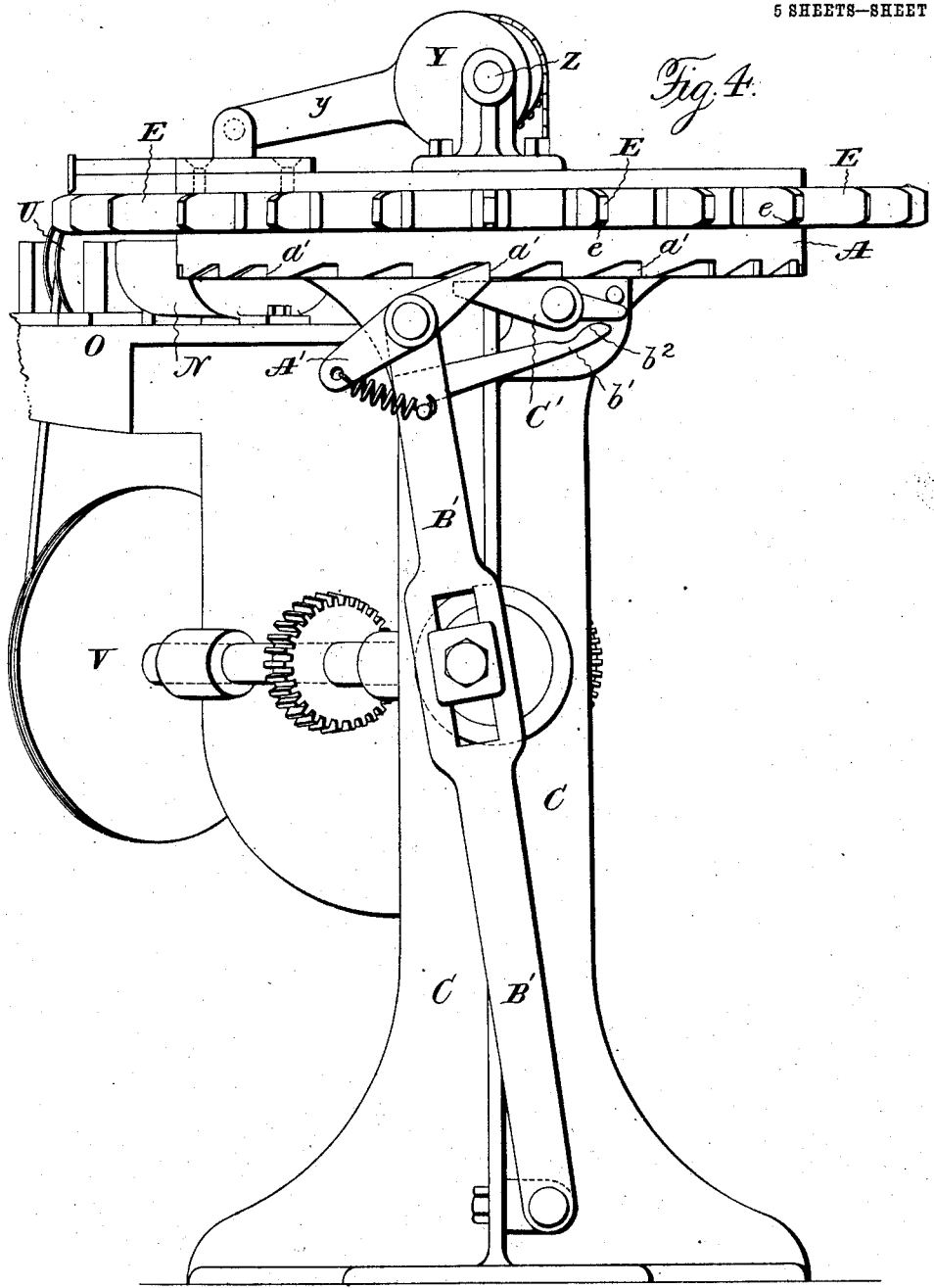

T. A. PALMER & C. A. CARLSON.
BOX SANDING MACHINE.
APPLICATION FILED OCT. 19, 1899
901,367.
Patented Oct. 20, 1908.
5 SHEETS—SHEET 5.
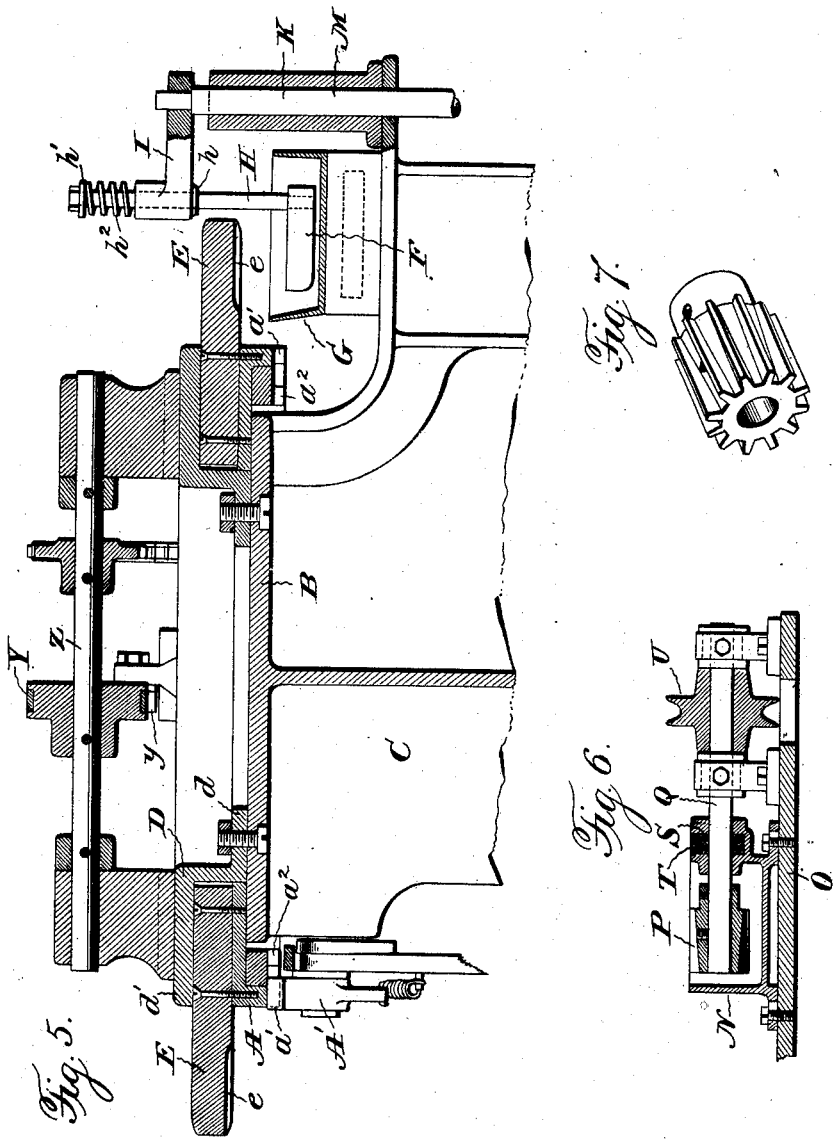
Witnesses:
Jas. E. Hutchinson
Henry C. Hazard
Inventors.
Tom A. Palmer and Carl A. Carlson, by
Crindle and Russell, their Atty's

UNITED STATES PATENT OFFICE.

THOMAS A. PALMER, OF AKRON, AND CARL A. CARLSON, OF BARBERTON, OHIO, ASSIGNORS TO THE DIAMOND MATCH COMPANY, OF CHICAGO, ILLINOIS, A CORPORATION OF ILLINOIS.

BOX-SANDING MACHINE.

No. 901,367.  Specification of Letters Patent.  Patented Oct. 20, 1908.

Application filed October 19, 1899. Serial No. 734,062.

*To all whom it may concern:*

Be it known that we, THOMAS A. PALMER, of Akron, Summit county, Ohio, and CARL A. CARLSON, of Barberton, in the county of Summit and in the State of Ohio, have invented certain new and useful Improvements in Box-Sanding Machines, and do hereby declare that the following is a full, clear, and exact description thereof, reference being had to the accompanying drawings, in which—

Figure 1 is a perspective view of a box sanding machine embodying our improvements; Fig. 2 a top plan view thereof; Fig. 3 an end elevation; Fig. 4, a vertical section on the line $x$—$x$ of Fig. 2, parts being shown in elevation; Fig. 5 a detail section through the sand-throwing mechanism; and Fig. 6 a detail perspective view of the sand wheel.

Letters of like name and kind refer to like parts in the several figures.

The object of our invention is to produce a thoroughly practical and simple machine for applying sand to the surfaces of match boxes to provide scratch surfaces thereon, and to this end, said invention consists in the sanding machine constructed substantially as hereinafter specified.

Our machine has been designed to apply sand to an exterior surface of boxes of the class consisting of a tray or receptacle part, and a cover part in the form of a flat-sided tube, the cover part being commonly called the shuck or slide, and the sand being applied to it.

Generally described, our machine comprises a rotary head from the side or periphery of which projects a series of radial, equi-distant fingers, adapted each to receive and support a box shuck, and by the rotation of the table, present the same successively to a glue applying device, a sand applying device, and finally to a discharge device.

The head A, is preferably ring-form in shape, and is mounted upon a table B on the top of a standard C, being journaled by a vertical ring D bolted to the table B by a horizontal flange $d$ and having a second flange $d^1$ that overlaps the head A. The shuck-receiving fingers E and E, are each in the form of a bar that has a shape and size in cross-section agreeing substantially with the like features of the shuck; and as shown, each bar is seated at its inner end in a radial recess in the head A, and is fastened by screws to the latter. Lugs $a$ and $a$ project from the head, on each side of the bar, and the outer ends of the lugs form stops to limit the end-wise movement of a shuck in being slid on to the bar. The outer end of the bar is rounded or beveled to enable a shuck to be readily shoved upon it.

A shuck, after being placed on the finger, or bar, is by the rotation of the head, carried to a glue-applying device, which comprises a bar F and a pan G containing glue, into and out of which the bar F is moved, taking glue upon its upper side and applying it to the side of the shuck over the underside of the holder bar, the glue bar F being attached near one end to a vertical rod H connected with a horizontal arm I fastened to the upper end of a vertical bar K. The bar K is reciprocated vertically by a cam, eccentric, or other means on a main or driving shaft L supported in bearings on the standard A, and it is guided in its movements by being passed through a post or upright M on said standard. To provide for the contingency of a shuck not being on a finger or bar E when the latter is presented over the glue bar F there is a cavity or recess $e$ in the bottom of the bar E of a size slightly larger than the glue-carrying part of the bar F. There is thus no surface on the bar E to which glue can be applied by the raising of the glue bar in the absence of a shuck. It is desirable that the glue bar shall bear against a shuck with a yielding pressure, and for this purpose, the rod H is not rigidly connected to the arm I but yieldingly, it being passed through an opening in said arm, and having a collar $h$ below the arm, and a head $h^1$ above it, between which and the arm is interposed a spring $h^2$.

After having received the glue, the shuck by the farther rotation of the head is carried to the sand-applying mechanism, which, generally, is of usual construction, comprising a dish-form box or receptacle N supported beneath the path of the shuck-holding bars E and E, upon a bracket O attached to the standard A, and a sand wheel P upon a shaft Q by which the wheel is rapidly revolved to cause it to throw sand against the glued surface of the shuck. The sand wheel is of usual construction in that it has a series of wings or vanes running parallel with its axis, but the wheel surfaces between the wings incline in radial directions from end to end, being nearest the wheel axis at the end nearest the head A. This inclination of the surface of the wheel, effects the drawing or feeding of the sand to the wheel, and insures that at all times there shall be an ample quantity of sand for the wheel to catch up and throw to the shuck. Sand is delivered to the box from an ordinary hopper R and the wheel draws the sand from the side of the box to which it is delivered from the hopper. The wheel shaft Q passes through an opening in the side wall of the box N and to prevent sand working along the shaft through such opening, a pocket S is provided for a packing T around the shaft, of some suitable material, such as waste and a lubricant, preferably graphite. Suitable bearings for the shaft are provided on the bracket O, and for rapidly revolving the shaft, a pulley U thereon is belted to a wheel V on a shaft beneath, supported at an angle to and geared by bevel gears, to the main shaft L.

Farther rotation of the head A brings the shuck to the ejecting or discharging mechanism, which as shown, consists of a vertical finger or plate W having a beveled lower edge in the plane of the upper sides of the shuck-holding bars F and F, and adapted to engage the shuck on its inner end, and by an outward movement, slide the shuck off the bar F. Said plate W is fixed to the outer end of a bar X placed in a guideway that extends radially on the ring flange $d^1$, and reciprocated in such guideway by an eccentric Y, with which it is connected by a rod $y$, said eccentric being on a shaft Z journaled in bearings on the ring flange $d^1$, and revolved by sprocket gearing from the main shaft L.

For automatically revolving the head A step by step, we employ a pawl and ratchet mechanism, that consists of ratchet teeth $a^1$ and $a^1$ on the underside of the head, and a pawl $A^1$ hung on the upper end of a lever $B^1$ that is pivoted at its lower end to the standard C, and is vibrated by a crank or eccentric connection with the driving shaft, L. To prevent overthrow of the head A by the pawl and ratchet mechanism, and thus insure the proper relative positions of a shuck-holding bar and the glue bar, and the shuck ejector finger, means are provided to positively arrest the motion of the head A at the exact limit designed. As shown, such means comprise a series of ratchet teeth $a^2$ and $a^2$ on the head A, and a dog $C^1$ pivoted to the standard C, and weighted to hang normally out of engagement with said teeth. A stud or projection $b$ on the side of the lever $B^1$, strikes the underside of the dog $C'$, when said lever completes its head-moving motion, and puts the dog in engagement with one of the stop teeth. Gravity, or other means may be provided to disengage the dog from its tooth, but preferably this is done by attaching to the lever $B^1$ a finger $b^1$ that passes beneath the tail of the dog, on the forward motion of the lever $B^1$, and has a raised surface $b^2$, in whose path on the return movement of the lever, said tail extends, and which, therefore, then engages the tail, and raising it, frees the dog from the stop tooth.

The operation of our machine is, briefly, as follows:—A boy, or other operator, places the shucks to be sanded upon the fingers or bars F and F, taking a shuck in each hand, sliding the two at once upon two adjacent bars or fingers. Both hands can thus be used because of the horizontal position of the table. By the step by step rotation of the head A, the shucks are brought in succession to a position over the glue-applying bar, and being stationary at such point, the glue-bar is raised to apply the glue. Farther movement of the head takes the shucks to and past the sanding mechanism, and then finally to the ejector, which is at the inner limit of its motion when a shuck is presented to it, and is moved outward to eject the shuck while the head is at rest.

It is to be understood that though we have specifically described certain details of construction as characterizing our machine, we do not thereby intend to restrict the scope of the invention, broadly considered, to such, or any specific details.

Having thus described our invention, what we claim is:—

1. In a box-sanding machine, the combination of sanding mechanism, a rotary head with a horizontal series of fingers upon which box shucks are thrust, and an ejector for removing shucks from said fingers comprising a reciprocating bar having a shuck engaging finger, substantially as described.

2. In a box-sanding machine, the combination of a ring-form head having a series of box-part holders, a bearing for said head having a flange overlapping the same, and a reciprocating box-part ejector mounted on said flange, substantially as described.

3. In a box-sanding machine, the combination of a ring-form head, having a series of box-part holders, a table having a journal for the head, and a flange overlapping the head, gluing and sanding mechanisms, and an ejector mounted on said flange, substantially as described.

4. In a machine to sand boxes, the combination of glue-applying mechanism, and a box-part holder having a recess opposite the glue-applying device, substantially as described.

5. In a machine to sand boxes, the combination of a glue-applying bar, and a box-part holder having a recess opposite the bar, substantially as described.

6. In a box-sanding machine, the combination of a sand holder, and a centrifugally-acting sand wheel having its surface in an axial direction inclined, substantially as described.

7. In a box-sanding machine, the combination of a sand-holder and a sand wheel having axially-extending wings or vanes, between which are surfaces that incline towards the wheel axis, substantially as described.

8. In a box sanding machine, the combination of a head having a series of box-part holders, two sets of teeth on the head, a feed pawl for one set, and a stop pawl for the other set, a lever carrying the feed pawl adapted to disengage the stop-pawl, and glue and sand-applying mechanisms, substantially as described.

In testimony that we claim the foregoing we have hereunto set our hands this 12th day of September 1899.

TOM. A. PALMER.
CARL A. CARLSON.

Witnesses:
G. M. SYPHER,
B. C. ROSS.